United States Patent [19]

Somerset

[11] Patent Number: 4,711,029
[45] Date of Patent: Dec. 8, 1987

[54] COOKERY IMPLEMENT

[75] Inventor: John B. Somerset, Armadale, Australia

[73] Assignee: McPherson's Limited, Australia

[21] Appl. No.: 899,214

[22] Filed: Aug. 21, 1986

[30] Foreign Application Priority Data

Aug. 21, 1985 [AU] Australia .............................. PH2062

[51] Int. Cl.⁴ ................................................. C21D 1/00
[52] U.S. Cl. ........................................ 30/148; 30/169
[58] Field of Search .................... 30/142, 164.5, 164.8, 30/169, 172, 299, 148, 147; D7/137, 148

[56] References Cited

U.S. PATENT DOCUMENTS 2,814,870 12/1957 Treiber ................................. 30/142
3,174,223 3/1965 Gerson ................................. 30/142

FOREIGN PATENT DOCUMENTS 418645 12/1910 France ................................. 30/142

Primary Examiner—Douglas D. Watts
Attorney, Agent, or Firm—Lerner, David, Littenberg, Krumholz & Mentlik

[57] ABSTRACT

A cookery implement having a handle and a spatula blade for contacting food being prepared. A plurality of puncturing prongs are provided at the side edge of the spatula blade near to the end edge remote from the handle, the tips of the puncturing prongs being directed sideways so that food can be punctured or pierced by movement of the blade in a direction generally transverse to the line from the handle to the food contacting end of the blade.

3 Claims, 2 Drawing Figures

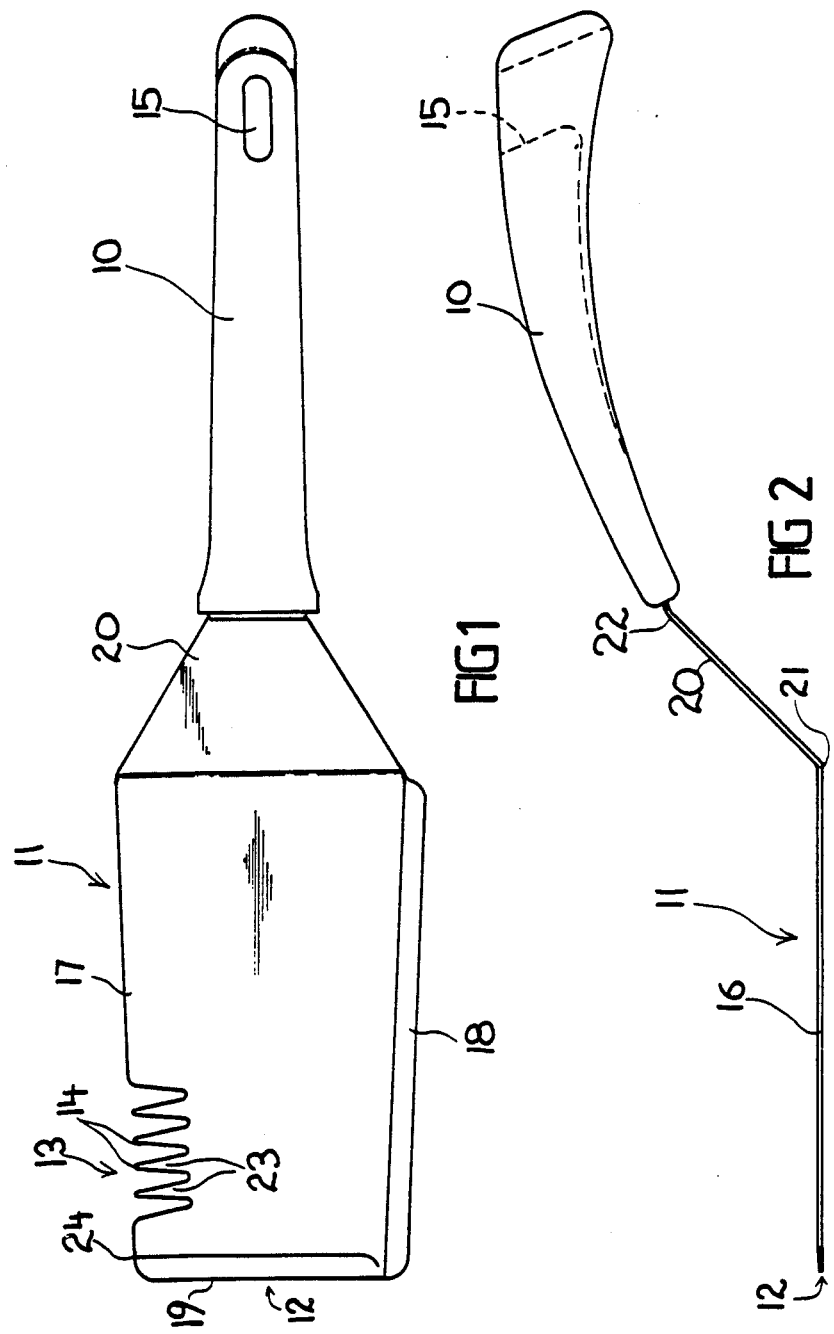

COOKERY IMPLEMENT

This invention relates to cookery implements and particularly although not exclusively to cookery implements suitable for use in cooking food in a frying pan or on hot plate such as a barbecue hotplate.

The cooking of sausages on a hotplate or otherwise, such as when barbecuing sausages, requires the skins of the sausages to be pierced. This enables the juices, fats and gases to escape without splitting of the sausage skins. This piercing of the sausage skins has been achieved usually by stabbing of the sausages with a table fork or the like. In this operation, the user's hand may be moved to a position generally directly over the sausages for carrying out a downward stabbing movement and this can result in the user's hand being burnt or spattered with hot fat or the like. Alternatively, if the user attempts to pierce the sausage skins by a stabbing motion from the side to avoid placing the hand directly above the cooking area, the sausages will move or can be dislodged from their desired position.

It is an object of the present invention to provide a cookery implement that can be used in a way that overcomes the above described disadvantages.

According to the present invention there is provided a cookery implement including: a handle for being grasped by the user of the implement, a food contact portion connected to the handle and for contacting food being cooked, the food contact portion having a food contact end remote from the handle and a plurality of puncturing means at or near the food contact end, the puncturing means having pointed tips directed transverse to the general line from the handle to the food contact and so as to enable puncturing or piercing of food on a food preparation surface by movement of the food contact end into contact with the food, the movement being in a direction generally transverse to the line from the handle to the food contact end. This arrangement of features will enable sausages or other food to be pierced, aerated or punctured by the puncturing means but without the user's hand needing to be placed directly above the food being cooked or without the risk of dislodging and moving the food across the food preparation area, whether that area be a hotplate, grill, frying pan or the like.

Preferably the food contact portion is in the general form of a flat spatula blade enabling the blade to be slid under the food being prepared to enable the food to be manipulated, the puncturing means comprising a plurality of flat pronge lying in the general plane of the spatula blade. In the preferred embodiment the spatula blade has a side edge extending generally in the direction of the line from the handle to the food contact end, and an end edge furthest from the implement handle and constituting the food contact end, the prongs being formed from the flat material comprising the spatula blade at the side edge of the spatula blade and at or near the end edge.

A preferred embodiment according to the present invention will be particularly described with reference to the accompanying drawings, however it is to be appreciated that the particularity of the accompanying drawings does not limit the scope of the present invention. In the drawings:

FIG. 1 is a top plan view of a cookery implement according to a preferred embodiment of the present invention, and FIG. 2 is a side elevational view of the cookery implement of FIG. 1.

The cookery implement in the drawings includes a handle 10 for being grasped by the user of the implement. A food contact portion 11 is connected to the handle 10 and is for contacting food being cooked. The food contact portion 11 has a food contact end 12 remote from the handle 10 and a plurality of puncturing means 13 near the food contact end 12. The puncturing means 13 have pointed tips 14 directed transverse to the general line from the handle 10 to the food contact end 12 so as to enable puncturing or piercing of food on a food preparation surface by movement of the food contact end into contact with the food, the movement being in a direction generally transverse to the line from the handle 10 to the food contact end 12.

The handle 10 of the implement may be of any convenient construction and material. The handle shown is of generally conventional form and for that purpose can be made of a heat insulating material and it is generally elongated in the direction from the handle 10 to the food contact end 12. A hole 15 through the outer end of the handle 10 is provided for the implement to be hung from for storage purposes.

The food contact portion 11 of the implement in the illustrated embodiment is in the general form of a spatula blade 16 made for example of relatively stiff but resilient sheet metal. That is, the food contact portion 11 is in the general form of a flat plate so that the plate can be slid under the food being prepared, such as on a hotplate, enabling the food to be manipulated such as being turned over or readily removed from the food preparation area after cooking. The spatula blade 16 is shown as generally rectangular in configuration and have opposite side edges 17,18 extending generally parallel to the line from the handle 10 to the food contact end 12, and an end edge 19 defining the food contact end 12. Side edge 18 and the end edge 19 are bevelled to facilitate insertion of the spatula blade 16 beneath food being prepared and also to enable selective slicing or cutting of portions of food being cooked, such as cutting of sinewy or gristle portions of meat which can cause the meat to curl upwardly and lift from the hotplate.

The spatula blade 16 may be connected to the handle 10 in any convenient manner. In the illustrated example there is provided a connecting portion 20 located between the handle 10 and the spatula blade 16 in the form of an extension of the flat spatula blade 16. Alternatively the connecting portion 20 may be in the form of a shank of a rod-like form (not illustrated). The connecting portion 20 is angled to the spatula blade 16 and to the handle 10 to enable the blade 16 to be placed flat against the cooking surface without the user's hand contacting the surface. That is, with the spatula blade 16 flat against a horizontal surface (see FIG. 2), the connecting portion 20 extends upwardly and rearwardly from the rear edge 21 of the spatula blade 16, the implement handle 10 extending rearwardly from the connecting portion upper end 22 generally along a line at a shallower angle to the horizontal than the general line of the connecting portion 20. In this way the handle 10 can be grasped in one hand by a user and the spatula blade 16 can be laid flat against a horizontal surface without the user's knuckles contacting the surface.

The plurality of puncturing means 13 comprise a plurality of prongs 23 at or near the food contact end 12. In the illustrated case where the food contact portion 11 is a flat spatula blade 16, the prongs 23 are also falt and lie in the general plane of the spatula blade 16. Conveniently the food puncturing prongs 23 are formed from the flat plate of the spatula blade 16 at side edge 17 of the spatula blade 16 and preferably at or, as shown, near the end edge 19 of the spatula blade 16. That is, the prongs 23 are located at or near the end of the side edge 17 of the spatula blade furthest from the implement handle 10. Locating the prongs 23 a short distance from the end edge 19 leaves a short portion 24 of the side edge 17 at the front to protect the prong tip nearest the front edge 19 from damage. The prongs 23 as mentioned previously are generally flat along their length, the outermost extremities defining the pointed tips 14 for piercing or puncturing the food. The spacing between adjacent prongs 23 preferably enables ready cleaning of food particles that may adhere to the spatula blade 16 between the puncturing prongs 23.

It will be seen that the cookery implement according to the preferred embodiment of the present invention as described herein and as illustrated can be used quite conventionally as a spatula or food lifter and scraper for hotplates. However the provision of puncturing prongs 23 at the front side edge of the blade 16 enables the implement to be turned through 90° so that the plane of the spatula blade 16 is generally vertical and food such as sausages on a barbecue hotplate to be pierced or punctured by means of the pointed tips 23. During this operation the user need not locate the hand holding the handle 10 over the cooking area, nor will the sausages be dislodged and moved horizontally across the cooking surface.

It will be appreciated that modifications to the invention can be readily made without departing from the scope of the inventive concept. For example, the plurality of puncturing means may be provided on a food contact portion in the general form of a fork. In this way the fork prongs would as in conventional forks extend generally along the line from the handle to the food contact end, while the puncturing prongs would extending transverse to that line.

Having now described my invention, what I claim as new and desire to secure by Letters Patent is:

1. A cookery implement comprising a handle having a predetermined width, a substantially flat blade lying in a predetermined plane and having a first end and a second end defining a longitudinal axis for said blade, said blade including first and second side edges extending substantially along said longitudinal axis, a connecting portion for connecting said handle to said first end of said blade, said connecting portion extending angularly upwards and away from said first end of said blade out of said predetermined plane so that said handle is offset from said blade, said blade extending from said connecting portion substantially along said longitudinal axis and having a width transverse to said longitudinal axis which is substantially greater than said predetermined width of said handle, a first cutting edge formed along said first side edge of said blade, a second cutting edge formed along said second end of said blade, and a plurality of spaced prongs provided at said second side edge of said blade, said plurality of spaced prongs being located in spaced relationship from said first and second ends of said blade so that at least a portion of said second side edge extends on both sides of said plurality of spaced prongs, each of said plurality of prongs extending generally transversely to said second side edge and being generally contained within the predetermined plane of said blade and having a narrow tip at its extremity which does not project substantially beyond said second side edge of said blade.

2. The cookery implement of claim 1 wherein said plurality of spaced prongs is located adjacent to said second end of said blade.

3. The cookery implement of claim 1 wherein said connecting portion is formed integrally with said blade, and wherein said handle is offset from said blade by a distance which enables a hand to be passed between said handle and a surface extending from said predetermined plane of said blade.

* * * * *